US011354642B1

(12) United States Patent
Hammad et al.

(10) Patent No.: US 11,354,642 B1
(45) Date of Patent: Jun. 7, 2022

(54) SYSTEMS AND METHODS FOR REAL TIME, AUTOMATED NEGOTIATION AMONG PARTIES TO A TRANSACTION

(71) Applicant: JPMorgan Chase Bank, N.A., New York, NY (US)

(72) Inventors: Ayman Hammad, Pleasanton, CA (US); William S. Wallace, Downington, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 389 days.

(21) Appl. No.: 15/069,458

(22) Filed: Mar. 14, 2016

(51) Int. Cl.
*G06Q 20/22* (2012.01)
*G06Q 20/10* (2012.01)

(52) U.S. Cl.
CPC .......... *G06Q 20/22* (2013.01); *G06Q 20/105* (2013.01)

(58) Field of Classification Search
None
See application file for complete search history.

(56) References Cited

U.S. PATENT DOCUMENTS

| | | | | |
|---|---|---|---|---|
| 7,593,862 B2* | 9/2009 | Mankoff | ................ | G06Q 10/10 705/14.1 |
| 8,615,426 B2* | 12/2013 | Carlson | ................. | G06Q 30/02 705/14.1 |
| 8,788,333 B2* | 7/2014 | Alba | ..................... | G06Q 20/12 705/14.29 |
| 8,939,356 B2* | 1/2015 | Pourfallah | ........... | G06Q 20/347 235/375 |
| 2002/0062249 A1* | 5/2002 | Iannacci | .............. | G06Q 20/105 705/14.1 |
| 2009/0099914 A1* | 4/2009 | Lang | .................. | G06Q 30/0224 705/14.25 |
| 2009/0239584 A1* | 9/2009 | Jheng | ...................... | H04W 8/26 455/558 |
| 2010/0250379 A1* | 9/2010 | Giordano | ............... | G06Q 20/00 705/20 |
| 2012/0284105 A1* | 11/2012 | Li | .......................... | G06Q 30/02 705/14.23 |
| 2013/0024371 A1* | 1/2013 | Hariramani | ........... | G06Q 20/36 705/41 |
| 2013/0339253 A1* | 12/2013 | Sincai | ................ | G06Q 20/3227 705/71 |
| 2014/0129357 A1* | 5/2014 | Goodwin | ............... | G06Q 30/02 705/16 |

* cited by examiner

*Primary Examiner* — William J Jacob
(74) *Attorney, Agent, or Firm* — Greenberg Traurig LLP

(57) ABSTRACT

A method for real time negotiation among parties to a transaction may include (1) a computer application executed by a computer processor on a mobile electronic device receiving, from a merchant computer processor at a merchant computer system, an offer to conduct a transaction using a first payment mechanism accepted by the merchant, the offer comprising a first consumer benefit; (2) comparing the first benefit to at least one consumer benefit preference; (3) automatically presenting a second payment mechanism associated with a second consumer benefit or a modification to the first consumer benefit; and (4) agreeing on an agreed payment mechanism and an agreed consumer benefit, wherein the agreed payment mechanism is the first payment mechanism or the second payment mechanism, and the agreed consumer benefit is the first consumer benefit, the second consumer benefit, or the modification to the first consumer benefit.

19 Claims, 3 Drawing Sheets

SYSTEMS AND METHODS FOR REAL TIME, AUTOMATED NEGOTIATION AMONG PARTIES TO A TRANSACTION

BACKGROUND OF THE INVENTION

1. Field of the Invention

The present invention generally relates to systems and methods for real time, automated negotiation among parties to a transaction.

2. Description of the Related Art

Consumers have choices when deciding how to pay for a transaction with a merchant. A consumer may select a payment mechanism, such as a credit card, based on the rewards that card may provide (e.g., airline miles, hotel points, cash back, etc.), interest rate, amount of available credit, etc. At the same time, merchants may negotiate with acquirers, and may also have an incentive for using a particular payment mechanism or payment network.

SUMMARY OF THE INVENTION

Systems and methods real time, automated negotiation among parties to a transaction are disclosed. In one embodiment, a method for real time negotiation among parties to a transaction may include (1) a computer application executed by a computer processor on a mobile electronic device receiving, from a merchant computer processor at a merchant computer system, an offer to conduct a transaction using a first payment mechanism accepted by the merchant, the offer comprising a first consumer benefit; (2) the computer application comparing the first benefit to at least one consumer benefit preference; (3) the computer application automatically presenting a second payment mechanism associated with a second consumer benefit or a modification to the first consumer benefit; and (4) the computer application and the merchant computer processor agreeing on an agreed payment mechanism and an agreed consumer benefit, wherein the agreed payment mechanism is the first payment mechanism or the second payment mechanism, and the agreed consumer benefit is the first consumer benefit, the second consumer benefit, or the modification to the first consumer benefit.

In one embodiment, the first payment mechanism or the second payment mechanism may include a traditional payment network, a proprietary payment network, or a non-traditional third party payment network.

In one embodiment, the first payment mechanism or the second payment mechanism may include a payment device issued by one of a plurality of payment device issuers.

In one embodiment, first payment mechanism may also be associated with a first merchant benefit.

In one embodiment, the first merchant benefit may include a reduced acquisition fee, a reduced network fee, a reduced charge back fee, and/or a monetary incentive.

In one embodiment, the first consumer benefit and the second consumer benefit may include a discount on the transaction, a reward, and/or a value-added payment feature.

In one embodiment, the method may further include conducting the transaction with the agreed payment mechanism.

In one embodiment, the method may further include the computer application modifying the consumer benefit preference based on at least one of the agreed payment mechanism and the agreed consumer benefit.

According to another embodiment, a method for real-time negotiation among parties to a transaction may include (1) a merchant computer processor at a merchant computer system communicating to a computer application executed by a computer processor on a mobile electronic device receiving, an offer to conduct a transaction using a first payment mechanism accepted by the merchant, the offer comprising a first consumer benefit; (2) the merchant computer processor receiving, from the computer application, a second payment mechanism associated with a second consumer benefit or a modification to the first consumer benefit; (3) the merchant computer processor comparing the first benefit to at least one user benefit preference; (4) the merchant computer processor and the computer application agreeing on an agreed payment mechanism and an agreed consumer benefit, wherein the agreed payment mechanism is the first payment mechanism or the second payment mechanism, and the agreed consumer benefit is the first consumer benefit, the second consumer benefit, or the modification to the first consumer benefit; and (5) the merchant computer processor completing the transaction with the agreed payment mechanism and the agreed consumer benefit.

In one embodiment, the first payment mechanism or the second payment mechanism may include a traditional payment network, a proprietary payment network, or a non-traditional third party payment network.

In one embodiment, the first payment mechanism or the second payment mechanism may include a payment device issued by one of a plurality of payment device issuers.

In one embodiment, first payment mechanism may also be associated with a first merchant benefit.

In one embodiment, the first merchant benefit may include a reduced acquisition fee, a reduced network fee, a reduced charge back fee, and/or a monetary incentive.

In one embodiment, the first consumer benefit and the second consumer benefit may include a discount on the transaction, a reward, and/or a value-added payment feature.

In one embodiment, a system for real-time negotiation among parties to a transaction may include a merchant hosting a merchant computer system comprising a merchant computer processor; an issuer hosting an issuer computer system; and at mobile electronic device comprising at least one computer processor and executing a computer application. The merchant computer processor may communicate an offer to conduct a transaction using a first payment mechanism accepted by the merchant to the computer application, the offer comprising a first consumer benefit. The computer application may receive the offer and compare the first benefit to at least one user benefit preference. The computer application may communicate a second payment mechanism associated with a second consumer benefit or a modification to the first consumer benefit to the merchant computer processor. The merchant computer processor may compare the first benefit to at least one user benefit preference. The computer application and the merchant computer processor may agree on an agreed payment mechanism and an agreed consumer benefit. The agreed payment mechanism may be the first payment mechanism or the second payment mechanism, and the agreed consumer benefit may be the first consumer benefit, the second consumer benefit, or the modification to the first consumer benefit. The merchant computer processor may complete the transaction with the agreed payment mechanism and the agreed consumer benefit.

In one embodiment, the first payment mechanism or the second payment mechanism may include a traditional payment network, a proprietary payment network, or a non-traditional third party payment network.

In one embodiment, the first payment mechanism or the second payment mechanism may include a payment device issued by one of a plurality of payment device issuers.

In one embodiment, first payment mechanism may also be associated with a first merchant benefit.

In one embodiment, the first merchant benefit may include a reduced acquisition fee, a reduced network fee, a reduced charge back fee, and/or a monetary incentive.

In one embodiment, the first consumer benefit and the second consumer benefit may include a discount on the transaction, a reward, and/or a value-added payment feature.

Embodiments disclosed herein involve real-time, automated negotiation of offers among parties to a transaction—generally, a merchant, an issuer, and a consumer—based on defined preferences. In one embodiment, the consumer may use a mobile wallet, a computer application, etc., and may communicate with the merchant and issuer.

In one embodiment, the negotiation may be based on programmed intelligence that maximizes benefits for all three parties. The negotiation may be manual, semi-automated, or fully automated based on, for example, preferences of each party, intelligence gained from prior transactions, etc. For example, in a manual embodiment, the consumer may actively bid on, or respond to, merchant offers. The consumer may present offers to the merchant or issuer in exchange for using a certain financial instrument and/or payment mechanism. In a semi-automated embodiment, the consumer may confirm (e.g., accept) the selection of a tailored merchant offer that may be negotiated by the merchant and the consumer's application. In a fully automated embodiment, the transaction between consumer and merchant may automatically occur based on preferences of the parties and/or intelligence gained from prior transactions.

In embodiments, negotiation may be initiated, for example, based on the consumer's location (e.g., when the consumer enters the merchant's facility), based on the consumer's preferences (e.g., the consumer prefers shopping at Nordstrom), based on when a payment device is presented to the merchant (e.g., the consumer opens an electronic wallet for payment), etc. etc.

In embodiments, tailored offers for consumers may be generated as a result of negotiations between the consumer and the merchant's backend. For example, in one embodiment, a consumer's profile, which may include the consumer's wallet, current and/or past transaction data, the consumer's preferences, etc. may be shared with merchant. The merchant may then create one or more tailored offer for the consumer. The consumer may receive the tailored offer(s) on the consumer's mobile device, in the mobile wallet, etc., and may accept the offer, make a counter offer, or reject the offer.

Similar negotiations may occur between the consumer and the issuer.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Figure 1:
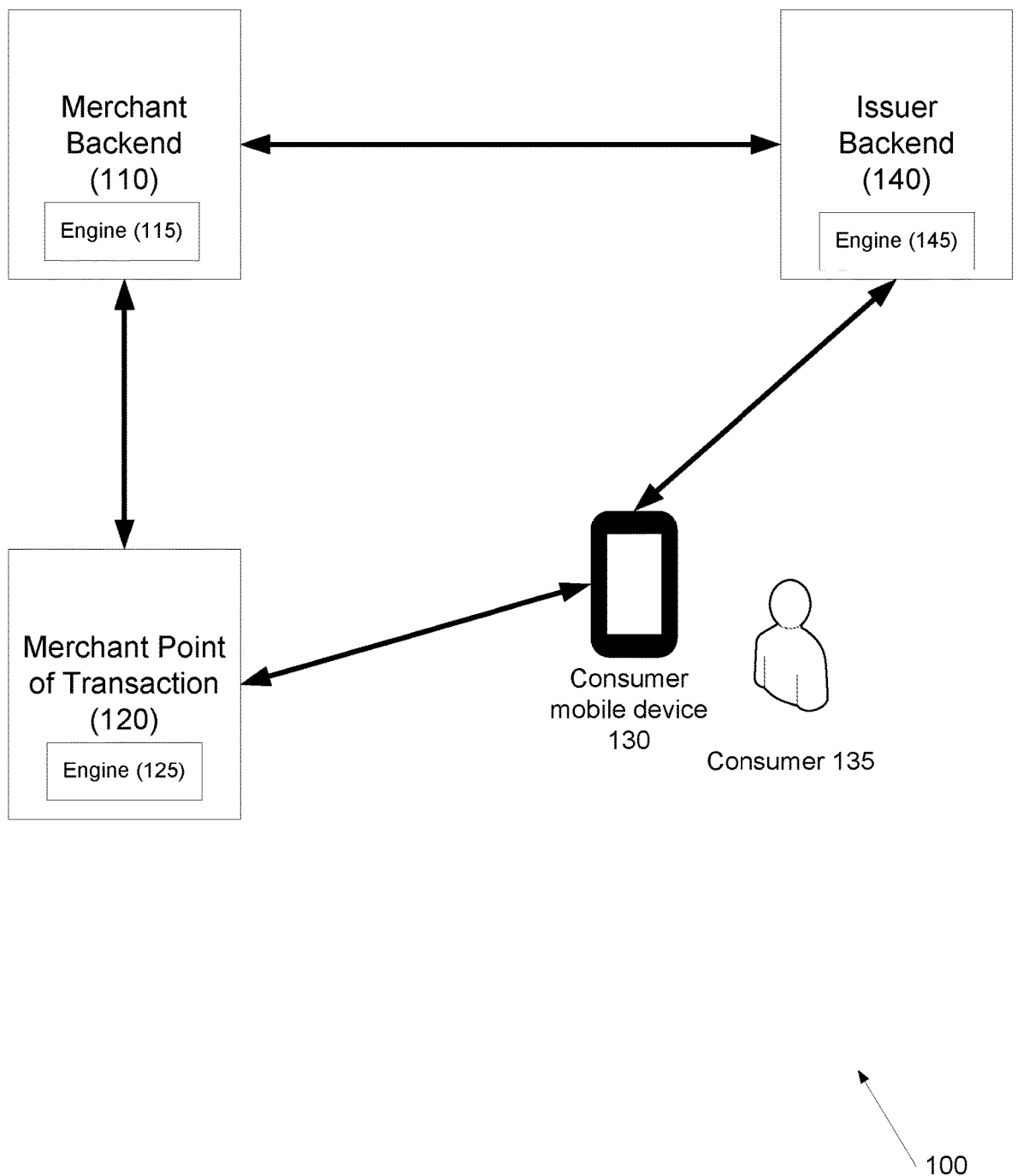
FIG. 1 depicts a system real time negotiation among parties to a transaction according to one embodiment.
Figure 2:
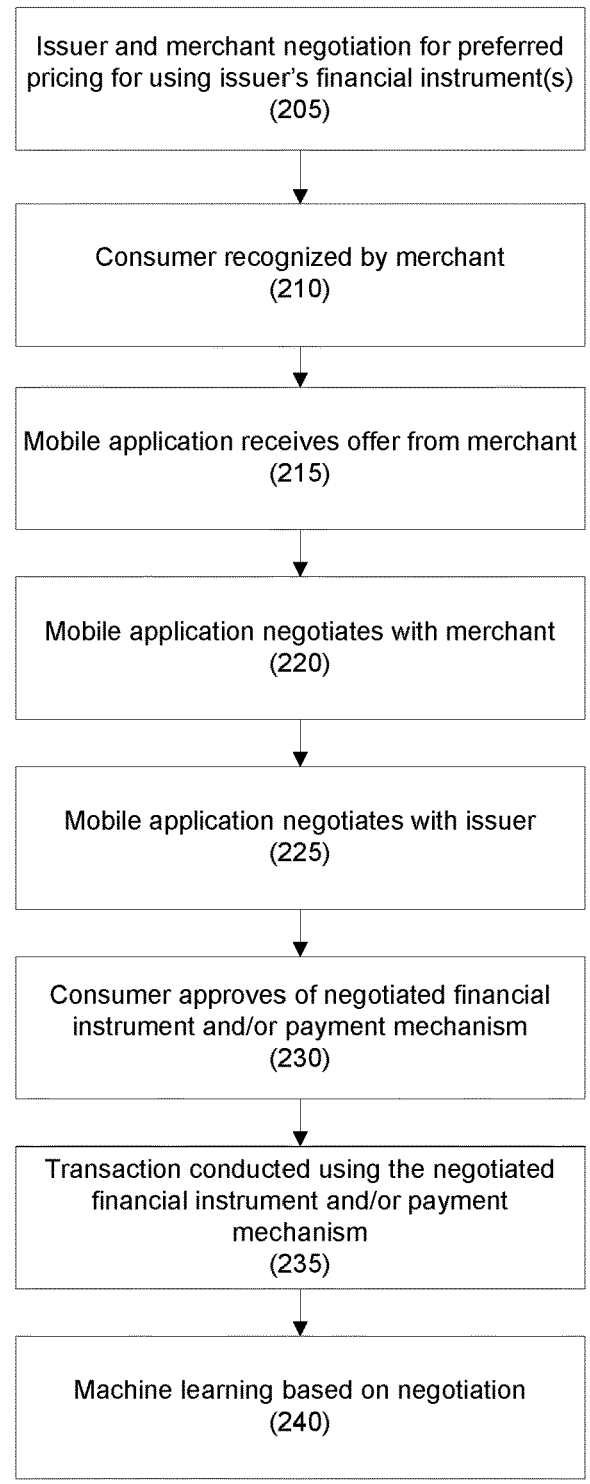
FIG. 2 depicts a method for real time negotiation among parties to a transaction according to one embodiment.
Figure 3:
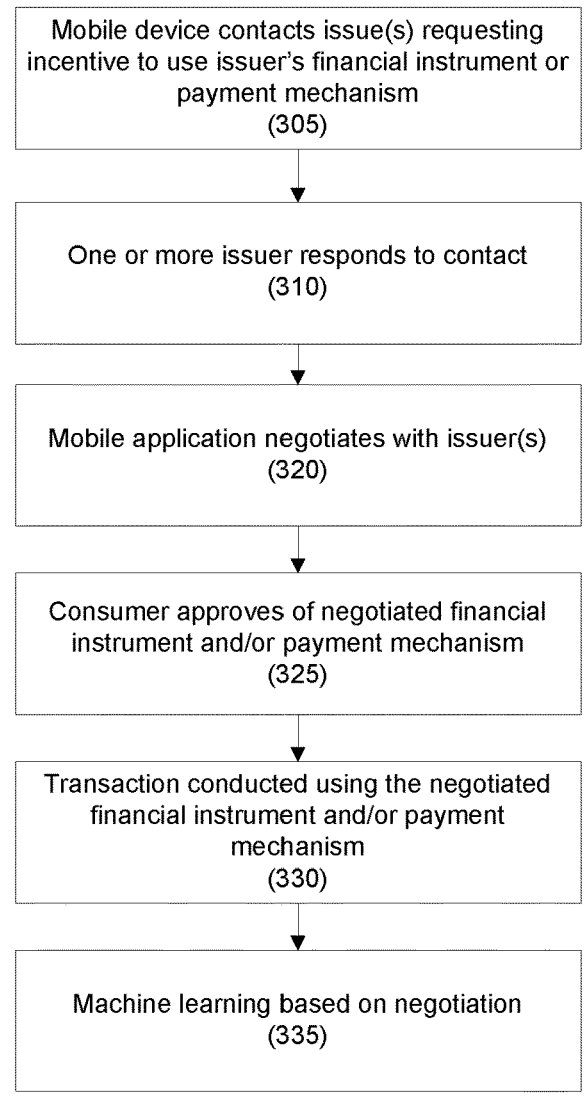
FIG. 3 depicts a method for real time negotiation among parties to a transaction according to one embodiment.

Several embodiments of the present invention and their advantages may be understood by referring to FIGS. 1-3.

Embodiments disclosed herein facilitate real time negotiation among parties to a transaction.

Referring to FIG. 1, a system for real time negotiation among parties to a transaction is disclosed according to one embodiment. System 100 may include merchant backend 110, merchant point of transaction 120, issuer backend 140, consumer mobile electronic device 130, and consumer 135. In one embodiment, one or more of merchant backend 110, merchant point of transaction 120, issuer backend 140, and consumer mobile electronic device 130 may communicate using any suitable communication network and/or payment network.

In one embodiment, merchant point of transaction 120 may include, for example a physical device (e.g., a point of sale terminal, tablet, etc.), hardware and/or software), interfaces that allow communication with merchant backend 110, etc.

In one embodiment, merchant point of transaction 120 may be a merchant location, a merchant website, a merchant application, etc. Merchant point of transaction 120 may include, for example, a beacon or other means for initiating communication with consumer mobile electronic device 130.

In one embodiment, merchant point of transaction 120 and merchant backend 110 may be the same entity). Each may provide, for example, authentication, merchant policies and negotiation parameters, etc.

In one embodiment, merchant backend 110 and merchant point of transaction 120 may include engines 115 and 125, respectively. Engines 115 and 125 may communicate with one another in real-time, periodically, as necessary and/or desired, etc.

In one embodiment, engine 115 and/or engine 125 may present one or more offers to consumer mobile electronic device 120 as in incentive for using a certain financial instrument and/or payment mechanism. Suitable payment mechanisms may include, for example, traditional payment networks (e.g., VISANET, the AMERICAN EXPRESS Network, the MASTERCARD network, etc.); proprietary payment networks (e.g., CHASENET), enriched-functionality payment networks, non-traditional third party payment networks/systems, etc.

In one embodiment, engine 115 and/or engine 125 may dynamically update promotions to offer to consumer 135. The offer may be based, for example, on inventory levels, season, past purchases, etc. In another embodiment, engine 115 and/or engine 125 may offer incentives to use a financial instrument and/or payment network that, for example, has the least expense to the merchant, provides the greatest incentive to the merchant (e.g., from the issuer), etc.

In one embodiment, engine 115, engine 125, and/or engine 145 may use machine learning what offers to make based on experience with consumers. For example, if a certain offer is made to consumers and is not accepted, a different offer may be made. The process may continue until an offer is determined to be successful is made.

In one embodiment, the application executed by mobile consumer electronic device 120 may also use machine learning based on prior interactions with merchants, issuers, etc.

In one embodiment, engine 115, engine 125, and/or engine 145 may create a two-way dialog with consumer application 135. For example, engine 115, engine 125, and/or engine 145 may offer a certain discount to consumer mobile electronic device 130 based on the consumer using a certain financial instrument and/or payment network, and may receive a request for an additional discount, a different offer, etc. from consumer application 130.

In one embodiment, issuer backend 140 may provide authentication and may host an issuer payment application that may be executed by consumer mobile electronic device 130. It may include an issuer profile and issuer negotiation parameters. It may further include negotiation rule engine 145 to negotiate with one or more of merchant backend 110 and consumer mobile electronic device 130.

In one embodiment, merchant backend 110 and issuer backend 140 may have a relationship, such as a merchant-acquirer relationship. For example, issuer backend 140 may provide merchant 110 with certain incentives for using the issuer's financial instruments and/or payment network, such as reduced or waived acquisition fees, reduced or waived network fees, reduced or waived chargeback fees, monetary incentives, a combination thereof, etc. As such, merchant backend 110 may have an incentive to encourage consumer 135 to use a certain financial instrument and/or payment network.

In one embodiment, consumer mobile electronic device 130 may execute one or more mobile applications, including mobile wallet applications, mobile payment applications, issuer mobile website access, etc. In one embodiment, it may enable consumer authentication, may store a consumer profile and consumer negotiation parameter, and may host a negotiation rule engine to negotiate with merchant backend 110 and/or issuer backend 140. In one embodiment, consumer profile may include consumer 135's personal information, past transaction information, consumer 135's available financial instruments, etc. In one embodiment, consumer preference may include consumer 135's preferences for using the issuer's financial instruments, or the financial instruments of another issuer. For example, consumer 135 may desire to use the financial instrument that will earn the most points or cash back rewards, earn a higher status in a loyalty program, has the lowest interest rate, has the highest credit limit, provides a promotion (e.g., installment payments, reduced/no interest rate, deferred interest, etc.), provided a value-added feature (e.g., convenience associated with shipping address information and/or payment information is on file), etc. In one embodiment, consumer application 130 may store preferences for consumer 135, which may be manually entered by consumer 135, automatically learned/trained from past behavior (e.g., consumer always uses an airline cobrand card when traveling), etc.

In one embodiment, negotiation parameters may provide consumer 135's guidelines for negotiating with merchant point of transaction 120 and/or issuer 140. For example, consumer 135 may set a parameter that it will always use financial instrument #1 unless the merchant gives at least a 10% discount for using a different financial instrument. As another example, consumer 135 may set a preference to use financial instrument #3 for expensive transactions unless the issuer gives extra cash back, loyalty points, etc. in exchange for using one of the issuer's financial instruments.

Notably, although only one issuer backend 140 is depicted in FIG. 1, it should be recognized that more than one issuer backend 140 may be provided. For example, consumer mobile electronic device 120 may negotiate with a plurality of issuer backends 140 in order maximize an incentive for conducting a transaction.

In one embodiment, consumer mobile electronic device 130 may communicate with merchant point of transaction 120 to "announce" its presence. This announcement may be made by any suitable communication, including, for example RF communication (e.g., WiFi, NFC, Bluetooth, etc.). In another embodiment, the presence may be announced by logging on to a merchant website.

In one embodiment, merchant point of transaction 120 may communicate to consumer mobile electronic device 130 a preferred financial instrument (e.g., the merchant's private label card), any incentives for other financial instruments, etc.

In one embodiment, consumer mobile electronic device 130 may act as a broker for consumer 135 and may negotiate with merchant point of transaction 120 and/or issuer backend 140 based on consumer 135's preferences, and may present the best offer to consumer 135.

In one embodiment, consumer mobile electronic device 130 may have a certain protocol for negotiating with merchant point of transaction 120 and/or issuer backend 140. For example, consumer mobile electronic device 130 may execute a simple protocol where it simply presents all offers from merchant point of transaction 120 and/or issuer backend 140 to consumer 135. Another protocol may involve receiving an offer from merchant point of transaction 120 and/or issuer backend 140 and presenting the offer in a second application. Other protocols may be used as necessary and/or desired.

In one embodiment, merchant backend 110 may have relationships with other issuers (not shown). Similarly, consumer 135 may have relationships with more than one issuer, may have multiple electronic wallets/payment applications on his or her mobile device, etc.

Referring to FIG. 2, a method for real time negotiation among parties to a transaction is disclosed according to one embodiment. In step 205, an issuer and a merchant may negotiate preferred pricing for one or more financial instrument issued by the issuer, consumer deposit accounts with the issuer. In one embodiment, the negotiation may further include preferred payment methods, payment networks, etc.

In one embodiment, the preferred pricing may include, for example, reduced or waived acquisition fees, reduced or waived network fees, reduced or waived chargeback fees, monetary incentives, a combination thereof, etc.

For example, a merchant may receive the best pricing/incentive for using a financial instrument issued by the issuer through the issuer's on-line payment application (e.g., a CHASE card using CHASEPAY). The next best pricing/incentive may be by using a financial instrument issued by the issuer and using the issuer's payment network (e.g., a CHASE card using CHASENET). The next level would be a financial instrument issued by the issuer and using another payment network (e.g., a CHASE card using VISANET, a CHASE card using APPLEPAY, etc.).

In step 210, a consumer using a mobile application may interact with a merchant point of transaction. In one embodiment, the mobile application may "announce" its arrival to a merchant by communicating via, for example, RF communication, by logging on to the merchant's website, etc. In one embodiment, the announcement may further include an identification of the types of financial instruments in the consumer's electronic wallet, issuers of those instruments, available payment mechanisms (e.g., APPLEPAY, CHASEPAY, AndroidPay, ACH, etc.).

In one embodiment, the merchant may push an offer to the mobile application, such as a discount for using a certain financial instrument, payment network, etc. In one embodiment, the offer may be a discount on the transaction, a discounted/free product, an installment payment program, low or no interest, deferred interest, monetary incentives, etc.

In one embodiment, the merchant offer may be a dynamic offer that may be based, for example, on the preferred pricing from the issuer, inventory levels, season, day of the week, time of year, past purchases, etc.

In step 215, the mobile application may receive the offer from the merchant. In one embodiment, the mobile application may display the merchant offer to the consumer for acceptance. In another embodiment, the mobile application may automatically consider the merchant offer against one or more of the consumer's negotiation parameters. If the merchant offer meets or exceeds one of the parameters, the mobile application may automatically accept the merchant offer.

In step 220, the consumer and/or the mobile application may negotiate with the merchant. In one embodiment, a two-way dialog may be established between the merchant and the mobile application. In one embodiment, the consumer and/or the mobile application may accept the offer, may reject the offer, or may make a counteroffer. In another embodiment, the mobile application may automatically make a counteroffer to the merchant.

In one embodiment, the merchant may respond to the counteroffer. In one embodiment, the merchant may reject the offer, present a counteroffer, or may accept the offer. The process may continue until the consumer or the merchant terminates negotiation by accepting or rejecting the outstanding offer.

In one embodiment, the mobile application and the merchant may negotiate without input from the consumer, and may present the final offer to the consumer for approval or rejection.

In step 225, the mobile application may also negotiate with the issuer. For example, the mobile application may present a transaction to the issuer, and request an incentive to use of the of the issuer's financial instruments, payment networks, etc.

In one embodiment, negotiation with the issuer may occur before negotiations with the merchant, in parallel with the negotiations with the merchant, or after negotiations with the merchant.

In step 230, the consumer may approve the negotiated financial instrument and/or payment network for the transaction.

In step 235, the transaction may be conducted using the negotiated financial instrument and/or payment network.

In step 240, the merchant and/or mobile application may use machine learning based on the negotiations between the mobile application and the merchant. For example, the merchant may use the results of the negotiation, whether successful or not, to inform a future offer. Similarly, the mobile application may use the results of the negotiation, whether successful or not, to update user preferences, negotiate with other merchants, etc.

It should be noted that a similar negotiation process may be used for a consumer to negotiate with a plurality of merchants. For example, referring to FIG. 3, a method for real time negotiation among parties to a transaction is disclosed according to one embodiment. In step 305, a mobile application may contact an issuer with a transaction and a request for an incentive to use one or more financial instrument issued by the issuer and/or a payment mechanism associated with the issuer.

In one embodiment, the mobile application may contact a plurality of issuers and negotiate with the issuers in parallel.

In one embodiment, the contact may include a specific request (e.g., a discount, reward points, a monetary incentive, etc.). In another embodiment, the contact may identify the transaction and/or the amount of the transaction, and may request an offer from the issuer. Any suitable information may be communicated as is necessary and/or desired.

In step 310, one or more issuer may respond to the contact. In one embodiment, the mobile application may display the issuer offer(s) to the consumer for acceptance. In another embodiment, the mobile application may compare multiple issuer offers, and present the best one. In still another embodiment, the mobile application may automatically consider all issuer offer(s) against one or more of the consumer's negotiation parameters. If the issuer offer meets or exceeds one of the parameters, the mobile application may automatically accept the issuer offer.

In step 320, the consumer and/or the mobile application may negotiate with the issuer(s). In one embodiment, a two-way dialog may be established between the issuer(s) and the mobile application. In one embodiment, the consumer and/or the mobile application may accept the offer, may reject the offer, or may make a counteroffer. In another embodiment, the mobile application may automatically make a counteroffer to the issuer(s).

In one embodiment, the issuer(s) may respond to the counteroffer. In one embodiment, the issuer(s) may reject the offer, present a counteroffer, or may accept the offer. The process may continue until the consumer or the issuer(s) terminates negotiation by accepting or rejecting the outstanding offer.

In one embodiment, the mobile application and the issuer(s) may negotiate without input from the consumer, and may present the final offer to the consumer for approval or rejection.

In step 325, the consumer may approve the negotiated financial instrument and/or payment network for the transaction.

In step 330, the transaction may be conducted using the negotiated financial instrument and/or payment network.

In step 335, the issuer(s) and/or mobile application may use machine learning based on the negotiations between the mobile application and the issuer(s). For example, the issuer(s) may use the results of the negotiation, whether successful or not, to inform a future offer. Similarly, the mobile application may use the results of the negotiation, whether successful or not, to update user preferences, negotiate with other issuer(s), etc.

Although several embodiments have been disclosed, it should be recognized that the embodiments are not necessarily exclusive.

The following documents are hereby incorporated, by reference, in their entireties: U.S. Pat. No. 8,984,276; U.S. patent application Ser. No. 14/699,511; U.S. Provisional Patent Application Ser. No. 62/148,493; U.S. Provisional Patent Application Ser. No. 62/107,800; and U.S. Provisional Patent Application Ser. No. 62/037,891.

Hereinafter, general aspects of implementation of the systems and methods of the invention will be described.

The system of the invention or portions of the system of the invention may be in the form of a "processing machine,"

such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for automated real-time negotiation among electronic representatives of parties to a transaction, comprising:

a consumer electronic representative computer program executed by a mobile electronic device comprising at least one computer processor establishing a connection with a merchant electronic representative computer program executed by a merchant computer system comprising at least one computer processor over a computer network;

the consumer electronic representative computer program receiving, over the computer network and from the merchant electronic representative computer program, an offer to pay for a transaction that is being conducted with the merchant, the offer to pay identifying a payment mechanism accepted by the merchant and a first consumer benefit;

the consumer electronic representative computer program displaying the offer on a display of the electronic device and receiving a rejection of the offer from a user of the electronic device;

the consumer electronic representative computer program retrieving a stored consumer benefit preference from a memory in the mobile electronic device, wherein the stored consumer benefit preference is automatically learned using machine learning based on at least one prior agreement between the electronic representative for the consumer and the electronic representative for the merchant in a past transaction;

the consumer electronic representative computer program comparing the first consumer benefit to the stored consumer benefit preference;

the consumer electronic representative computer program identifying a modification to the first consumer benefit based on the comparison of the first consumer benefit to the stored consumer benefit preference, wherein the modification to the first consumer benefit is different from the first consumer benefit and the stored first consumer benefit;

the consumer electronic representative computer program automatically communicating, over the computer network, the modification to the first consumer benefit to the merchant computer system;

without human intervention, the consumer electronic representative computer program and the electronic representative for the merchant automatically agreeing to an agreed consumer benefit, wherein the agreed consumer benefit is the modification to the first consumer benefit;

the consumer electronic representative computer program automatically updating the stored consumer benefit preference based on the agreed consumer benefit; and the consumer electronic representative computer program completing payment for the transaction with the electronic representative for the merchant.

2. The method of claim 1, wherein the payment mechanism comprises a traditional payment network, a proprietary payment network, or a non-traditional third party payment network.

3. The method of claim 1, wherein the payment mechanism comprises a payment device issued by one of a plurality of payment device issuers.

4. The method of claim 1, wherein the payment mechanism is further associated with a first merchant benefit.

5. The method of claim 4, wherein the first merchant benefit comprises at least one of a reduced acquisition fee, a reduced network fee, a reduced charge back fee, and a monetary incentive.

6. The method of claim 1, wherein the first consumer benefit and the stored consumer benefit comprises at least one of a discount on the transaction, a reward, and a value-added payment feature.

7. The method of claim 1, further comprising:
the electronic representative for the consumer modifying the consumer benefit preference based on the agreed consumer benefit.

8. An automated method for real-time negotiation among electronic representatives of parties to a transaction, comprising:
a merchant electronic representative computer program executed by a computer processor at a merchant computer system communicating, over a computer network and to a consumer electronic representative computer program executed by a mobile electronic device comprising at least one computer processor, an offer to complete a transaction that is being conducted with the consumer, the offer identifying a payment mechanism accepted by the merchant and a first consumer benefit, wherein the consumer electronic representative computer program display the offer on a display of the electronic device and receives a rejection of the offer from a user of the electronic device;

the merchant electronic representative computer program retrieving, from the electronic representative for the consumer and over the computer network, a modification to the first consumer benefit, wherein the modification to the first consumer benefit is different from the first consumer benefit and is automatically learned using machine learning based on at least one prior agreement between the electronic representative for the consumer and the electronic representative for the merchant in a past transaction;

without human intervention, the merchant electronic representative computer program and the consumer electronic representative computer program automatically agreeing to an agreed consumer benefit, wherein the agreed consumer benefit is the modification to the first consumer benefit;

the merchant electronic representative computer program automatically updating the stored consumer benefit preference based on the agreed consumer benefit; and the merchant electronic representative computer program completing the transaction with the agreed consumer benefit.

9. The method of claim 8, wherein the payment mechanism comprises a traditional payment network, a proprietary payment network, or a non-traditional third party payment network.

10. The method of claim 9, wherein the payment mechanism comprises a payment device issued by one of a plurality of payment device issuers.

11. The method of claim 8, wherein the payment mechanism is further associated with a first merchant benefit.

12. The method of claim 11, wherein the first merchant benefit comprises at least one of a reduced acquisition fee, a reduced network fee, a reduced charge back fee, and a monetary incentive.

13. The method of claim 8, wherein the first consumer benefit and the stored consumer benefit comprises at least one of a discount on the transaction, a reward, and a value-added payment feature.

14. A system for automated real-time negotiation among electronic representatives of parties to a transaction, comprising:
a merchant computer system comprising a merchant computer processor and executing a merchant electronic representative computer program; and
a mobile electronic device for a consumer comprising at least one computer processor and executing a consumer electronic representative computer program;
wherein:
the merchant electronic representative computer program communicates, over a computer network, an offer to complete a transaction that is being conducted with the consumer, the offer identifying a payment mechanism accepted by a merchant and a first consumer benefit, to the consumer electronic representative computer program;

the consumer electronic representative computer program receives the offer;

the consumer electronic representative computer program displays the offer on a display of the electronic device and receives a rejection of the offer from a user of the electronic device;

the consumer electronic representative computer program retrieves a stored consumer benefit preference from a memory in the mobile electronic device, wherein the stored consumer benefit preference is automatically learned using machine learning based on at least one prior agreement between the electronic representative for the consumer and the electronic representative for the merchant in a past transaction;

the consumer electronic representative computer program compares the first consumer benefit to the stored user benefit preference;

the consumer electronic representative computer program identifies a modification to the first consumer benefit for the payment mechanism based on the comparison of the first consumer benefit to the stored consumer benefit preference, wherein the modification to the first consumer benefit is different from the first consumer benefit and the stored first consumer benefit;

the consumer electronic representative computer program communicates the modification to the first consumer benefit to the merchant electronic representative computer program;

without human intervention, the consumer electronic representative computer program and the merchant electronic representative computer program automatically agree to an agreed consumer benefit, wherein the agreed consumer benefit is the modification to the first consumer benefit;

the consumer electronic representative computer program automatically updates the stored consumer benefit preference based on the agreed consumer benefit; and the merchant electronic representative computer program completes the transaction with the agreed consumer benefit.

15. The system of claim 14, wherein the payment mechanism comprises a traditional payment network, a proprietary payment network, or a non-traditional third party payment network.

16. The system of claim 14, wherein the payment mechanism comprises a payment device issued by one of a plurality of issuers.

17. The system of claim 14, wherein the payment mechanism is further associated with a first merchant benefit.

18. The system of claim 17, wherein the merchant benefit comprises at least one of a reduced acquisition fee, a reduced network fee, a reduced charge back fee, and a monetary incentive.

19. The system of claim 14, wherein the first consumer benefit and the stored consumer benefit comprises at least one of a discount on the transaction, a reward, and a value-added payment feature.

* * * * *